(12) United States Patent
Sumcad et al.

(10) Patent No.: US 12,409,806 B2
(45) Date of Patent: Sep. 9, 2025

(54) SYSTEM AND METHOD OF INHIBITING AND RESTORING IGNITION OF A VEHICLE

(71) Applicant: GM Global Technology Operations LLC, Detroit, MI (US)

(72) Inventors: Anthony J. Sumcad, Rochester Hills, MI (US); Suchinder K. Govindan, Farmington Hills, MI (US); Russell A. Patenaude, Macomb Township, MI (US); Matthew Edward Gilbert-Eyres, Rochester Hills, MI (US); Benjamin Tran, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/438,156

(22) Filed: Feb. 9, 2024

(65) Prior Publication Data

US 2025/0256681 A1  Aug. 14, 2025

(51) Int. Cl.
| | |
|---|---|
| *B60R 25/045* | (2013.01) |
| *B60R 25/20* | (2013.01) |
| *B60R 25/30* | (2013.01) |
| *B60R 25/31* | (2013.01) |
| *B60R 25/33* | (2013.01) |

(52) U.S. Cl.
CPC ............ *B60R 25/045* (2013.01); *B60R 25/20* (2013.01); *B60R 25/30* (2013.01); *B60R 25/31* (2013.01); *B60R 25/33* (2013.01)

(58) Field of Classification Search
CPC ... B60R 25/045; B60R 25/1012; B60R 25/20; B60R 25/30; B60R 25/31; B60R 25/33
See application file for complete search history.

(56) References Cited

U.S. PATENT DOCUMENTS

| | | | | |
|---|---|---|---|---|
| 5,783,989 | A * | 7/1998 | Issa | B60R 25/104 340/426.25 |
| 10,967,833 | B1 * | 4/2021 | Nagao | B60R 25/1012 |
| 2004/0236489 | A1 * | 11/2004 | Shibamori | E02F 9/24 701/50 |
| 2005/0270174 | A1 * | 12/2005 | Rumpf | B60R 25/042 340/870.16 |
| 2006/0090204 | A1 * | 4/2006 | Ogiso | B60R 25/20 340/425.5 |
| 2009/0033459 | A1 * | 2/2009 | Ichihara | G07C 9/00309 340/5.28 |
| 2009/0251284 | A1 * | 10/2009 | Wilson | F02N 11/103 123/179.2 |

(Continued)

FOREIGN PATENT DOCUMENTS

| | | |
|---|---|---|
| DE | 102016002946 A1 | 9/2016 |
| DE | 102019203345 A1 | 9/2020 |

(Continued)

*Primary Examiner* — John M Zaleskas
(74) *Attorney, Agent, or Firm* — Honigman LLP; Matthew H. Szalach; Jonathan P. O'Brien

(57) ABSTRACT

A computer-implemented method that, when executed by data processing hardware, cause the data processing hardware to perform operations comprising enabling remote ignition blocking for a first duration, determining a host vehicle status, and modifying the first duration of the remote ignition blocking according to the host vehicle status.

10 Claims, 5 Drawing Sheets

(56) References Cited

U.S. PATENT DOCUMENTS

| | | | |
|---|---|---|---|
| 2011/0163718 A1* | 7/2011 | Van Wiemeersch | H02J 7/14 320/109 |
| 2011/0163721 A1* | 7/2011 | Van Wiemeersch | H02J 9/002 320/128 |
| 2014/0225719 A1* | 8/2014 | Kesavan | B60R 25/102 340/425.5 |
| 2015/0005984 A1* | 1/2015 | De Los Santos | H04L 63/107 701/2 |
| 2015/0197235 A1* | 7/2015 | Yu | B60W 10/08 903/903 |
| 2017/0305466 A1* | 10/2017 | Nordbruch | B60R 25/00 |
| 2017/0371339 A1* | 12/2017 | Charette | B60W 10/20 |
| 2018/0126849 A1* | 5/2018 | Kanagaraj | B60K 28/10 |
| 2018/0272992 A1* | 9/2018 | Gage | G06V 20/56 |
| 2018/0299900 A1* | 10/2018 | Bae | G05D 1/0238 |
| 2019/0126910 A1* | 5/2019 | Kim | B60W 20/16 |
| 2020/0139930 A1* | 5/2020 | Carney Landow | G08G 1/042 |
| 2020/0231123 A1* | 7/2020 | Ko | G06F 21/35 |
| 2020/0271081 A1* | 8/2020 | Mulshine | B60R 25/1012 |
| 2020/0293795 A1* | 9/2020 | Mielenz | B60Q 9/00 |
| 2021/0094438 A1* | 4/2021 | Ciccone | B60L 58/24 |
| 2021/0122330 A1* | 4/2021 | Sung | B60R 25/305 |
| 2021/0229627 A1* | 7/2021 | Salter | B60R 25/01 |
| 2021/0231090 A1* | 7/2021 | Katoh | B60R 16/03 |
| 2021/0237683 A1* | 8/2021 | Nakashima | B60R 25/33 |
| 2021/0261090 A1* | 8/2021 | Innocenzi | B60R 25/30 |
| 2021/0261092 A1* | 8/2021 | Weber, Jr. | B60R 25/1004 |
| 2021/0331648 A1* | 10/2021 | Pham | G01S 17/88 |
| 2022/0009447 A1* | 1/2022 | Kleve | H04W 4/029 |
| 2022/0041131 A1* | 2/2022 | Lee | B60R 25/102 |
| 2022/0388476 A1* | 12/2022 | Weber, Jr. | B60R 25/1004 |
| 2023/0242075 A1* | 8/2023 | McClory | G05D 1/0022 340/5.2 |
| 2024/0140360 A1* | 5/2024 | Hanson | B60R 25/241 |
| 2024/0336223 A1* | 10/2024 | Fawaz | B60R 25/102 |
| 2024/0399998 A1* | 12/2024 | Gilbert-Eyres | B60R 25/31 |
| 2024/0400075 A1* | 12/2024 | Neely | B60W 50/082 |

FOREIGN PATENT DOCUMENTS

| | | | | |
|---|---|---|---|---|
| EP | 3825189 A1 | * | 5/2021 | ......... B60R 25/1012 |
| JP | 2007230319 A | * | 9/2007 | |
| WO | WO-2024034241 A1 | * | 2/2024 | |

* cited by examiner

SYSTEM AND METHOD OF INHIBITING AND RESTORING IGNITION OF A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to systems and methods of inhibiting and restoring operation of a vehicle.

Existing vehicles include systems that can remotely block an ignition and/or an engine from operating. For instance, if a vehicle is reported as stolen, a mobile advisor can send a remote signal to a communication system of the vehicle and prevent the vehicle from starting after it has been turned off. In this case, operation of the ignition or engine can only be restored by a dealership that contacts the mobile advisor on behalf of the owner of the vehicle. Some vehicle scenarios exist that lead to "walk home" situations that result from the owner and/or operator's inability to reset (i.e., restore) operation of the engine or ignition. An owner's control over inhibiting and/or restoring ignition or engine operation on command may be desirable to prevent theft or control a child's use of the vehicle. Existing systems are not equipped and/or are limited in their ability to readily inhibit and/or restore operation of the vehicle. Thus, shortcomings of existing systems are addressed by one or more aspects of the present disclosure.

SUMMARY

An aspect of the disclosure provides a vehicle management system. The vehicle management system includes a sensor system, an engine control module, an ignition module communicatively coupled to the engine control module, data processing hardware, and memory hardware in communication with the data processing hardware, the memory hardware storing instructions that, when executed on the data processing hardware, cause the data processing hardware to perform operations. These operations including gathering data indicating a number of actors in proximity of the host vehicle, determining whether the number of actors in proximity of the host vehicle is greater than a first threshold, inhibiting ignition of the host vehicle via the engine control module if the number of actors is greater than the first threshold, and restoring the ignition of the host vehicle via the engine control module if the number of actors is less than or equal to the first threshold.

Implementations of this aspect of the disclosure may include one or more of the following features. For example, the number of actors may include a number of people within a vicinity of the host vehicle. In another instance, the number of actors includes a number of vehicles within a vicinity of the host vehicle. In yet another instance, the number of actors may include a group of vehicles selected by the operator of the host vehicle using a mobile application. In at least one example, the number of actors may be determined with crowdsourcing. In at least another example, the number of actors may be determined with long range and short range vehicle communication capabilities.

Another aspect of the disclosure provides a vehicle management system. The vehicle management system includes a sensor system, an engine control module, an ignition module communicatively coupled to the engine control module, data processing hardware, and memory hardware in communication with the data processing hardware, the memory hardware storing instructions that, when executed on the data processing hardware, cause the data processing hardware to perform operations. These operations including gathering data indicating an environmental status or an operational status of the host vehicle, determining one or more conditions of ignition of the host vehicle based on the status of the host vehicle, inhibiting ignition of the host vehicle if one or more conditions are met, and restoring ignition of the host vehicle if one or more conditions are not met.

Implementations of this aspect of the disclosure may include one or more of the following features. For example, the environmental status may include operational hours of a nearby establishment. According to at least one example, the one or more conditions may be met if the nearby establishment is closed and the one or more conditions may not be met if the nearby establishment is open.

In another example, the environmental status may be a theft score calculated based on a time of day, location of the host vehicle, and population size in the county where the host vehicle is located. According to at least one example, the one or more conditions may be met if the theft score is greater than or equal to a minimum theft score and the one or more conditions may not be met if the theft score is less than the minimum theft score.

According to yet another aspect of the disclosure provides a computer-implemented method that, when executed by data processing hardware, cause the data processing hardware to perform operations comprising enabling remote ignition blocking for a first duration, determining a host vehicle status, and modifying the first duration of the remote ignition blocking according to the host vehicle status.

Implementations of this aspect of the disclosure may include one or more of the following features. For example, the host vehicle status may be the connectivity of the vehicle. The first duration of the remote ignition blocking may be shortened when the connectivity of the host vehicle is low.

In at least one example, the vehicle status may be the energy budget of the host vehicle. The remote ignition blocking may be disabled and a user of the host vehicle may be alerted when the energy budget is below a threshold value. The first duration of the remote ignition blocking may be shortened if the energy budget is above a threshold value.

In another example, the remote ignition blocking may disabled and a user of the host vehicle may be alerted when the first duration has expired.

In yet another example, the remote ignition block may be manually disabled via a mobile device or a call center.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
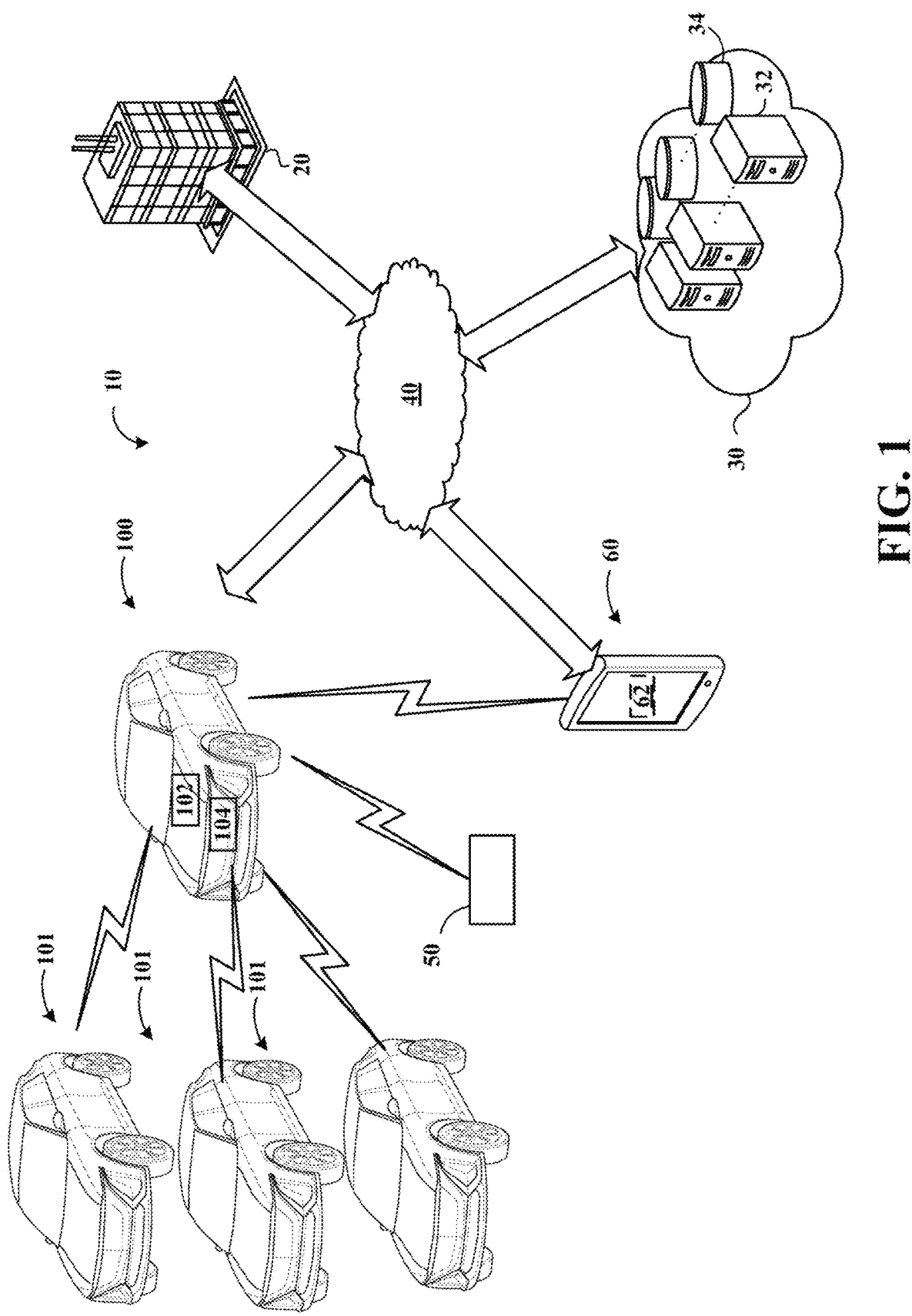
FIG. 1 is a schematic diagram of a vehicle environment including a vehicle management system according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below; the term "module" may be replaced with the term "circuit." The term "module" may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code: memory (shared, dedicated, or group) that stores code executed by a processor: other suitable hardware components that provide the described functionality: or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube). LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Referring to FIG. 1, an example vehicle operating environment 10 is provided for illustration of the principles of the present disclosure. The vehicle operating environment 10 generally includes a host vehicle 100, one or more additional vehicles 101, a call center 20, and a remotely located or off board cloud computing system or back office 30 (i.e., a back office or vehicle connectivity service). For the sake of illustration, the vehicle operating environment 10 is shown as including a single vehicle call center 20. However, in other examples, the vehicle operating environment 10 may include a plurality of call centers 20 in communication with the host vehicle 100 over a network 40 (e.g., the Internet, cellular networks). The call center 20 may include a remote facility or system that can communicate with the host vehicle 100. For instance, the call center 20 can communicate with the host vehicle 100 so as to remotely inhibit and/or restore operation of the host vehicle 100 (e.g., inhibit or restore operation of an ignition 102 or engine 104 of the host vehicle 100). The call center 20 may be arranged to communicate with the host vehicle 100 and provide the host vehicle 100 with a number of different system back-end functions. The call center 20 may store account information such as subscriber authentication information, vehicle identifiers, profile records, behavior patterns, and other pertinent subscriber information. The call center may be a manned call center 20 employing a live advisor or instead use a form of virtual reality or an automated advisor.

The back office 30 may be remote system that communicates and/or supports certain processes of the host vehicle 100. The back office 30 may provide the host vehicle 100 with one or more back end functions such as initiating either restoring or inhibiting operation of the ignition 102 and/or engine of the host vehicle 100. The back office 30 may include processing hardware 32 and memory hardware 34 so that, for example, the back office 30 can receive a request and of instructions from the vehicle 100 and process such request.

The vehicle operating environment 10 may additionally or alternatively include a remote key fob 50 configured to communicate with the host vehicle 100 and/or a mobile device 60 (e.g., a smartphone or tablet) configured to communicate with the host vehicle 100 directly or over the network 40, for example. The mobile device 60 may include a smartphone, a tablet, or another portable computer, for example. An original equipment manufacturer (OEM) application or mobile application 62 may be installed on the mobile device 60 and configured so that the owner or operator of the host vehicle 100 may communicate with the host vehicle 100 directly or via the network 40. Such communication may provide access (e.g., via a digital key) to the host vehicle 100 or provide insight or information as to one or more operating conditions (e.g., fuel level, battery level, air pressure, etc.) of the host vehicle 100.

The key fob 50 may be a remote key fob that is configured to communicate with the vehicle. As will be discussed in more detail below, the key fob 50 may communicate with the vehicle through short range communication capabilities (e.g., Bluetooth® Low Energy (BLE), Ultra wideband, etc.).

Figure 2:
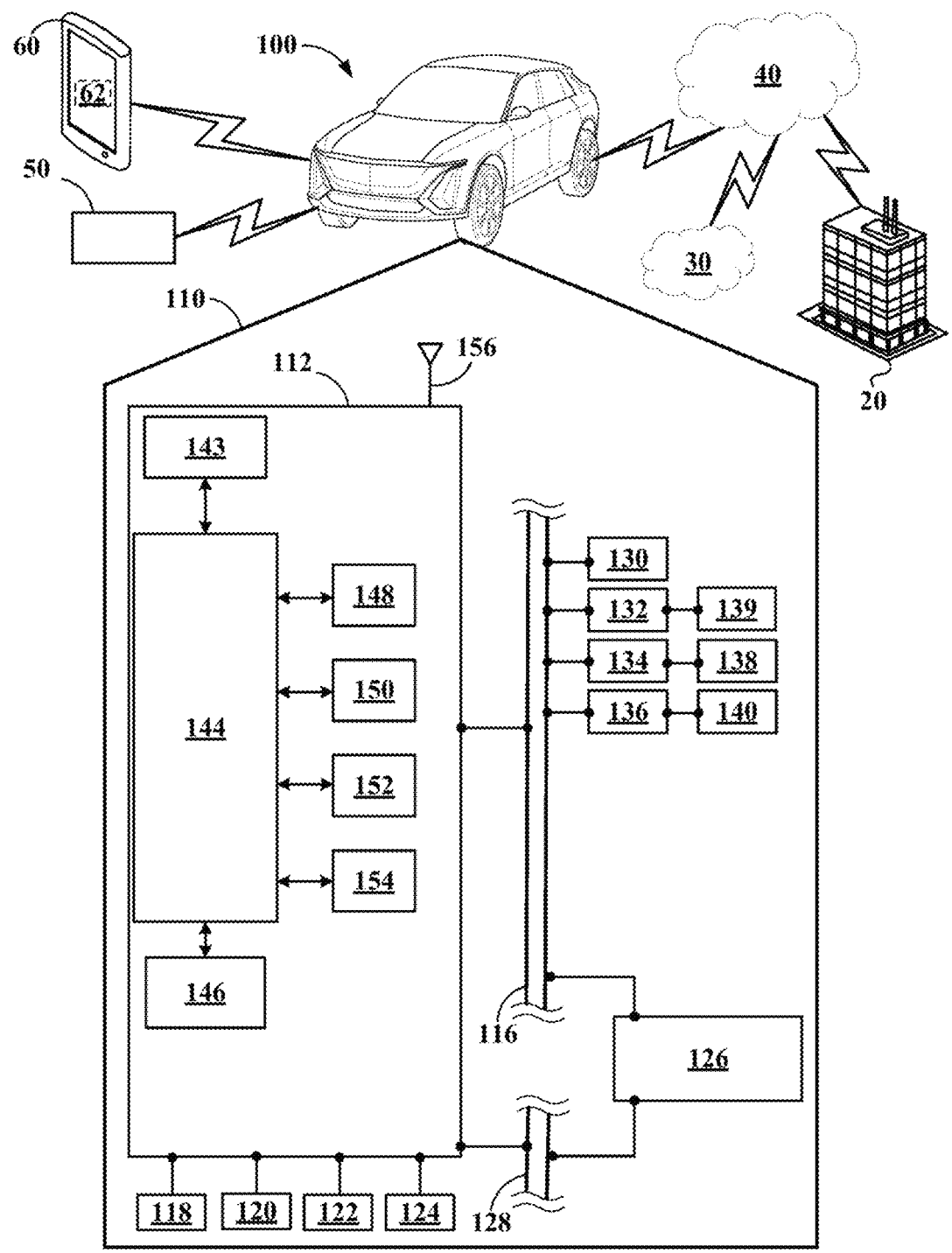
FIG. 2 is a schematic diagram of the vehicle management system of the vehicle of FIG. 1.

With reference to FIG. 2, the host vehicle 100 may be equipped with a vehicle management system (i.e., a telematics unit) 110 that includes a communication system 112 that can wirelessly communicate (e.g., via cell towers, base stations, and/or mobile switching centers (MSCs), etc.) with the remotely located or off board cloud computing system 30, for example. The vehicle management system 110 can be an OEM-installed (embedded) or aftermarket device that enables wireless voice and/or data communication over a wireless carrier system and via wireless networking so that the vehicle can communicate with call center 20, other telematics-enabled vehicles 101, or some other entity or device. The vehicle management system 110 can use radio transmissions to establish a communications channel (a voice channel and/or a data channel) with wireless carrier systems so that voice and/or data transmissions can be sent and received over the channel. By providing both voice and data communication, the vehicle management system 110 enables the host vehicle 101 to offer a number of different services including those related to navigation, telephony, emergency assistance, diagnostics, infotainment, etc. Data can be sent either via a data connection, such as via packet data transmission over a data channel, or via a voice channel, for example. For combined services that involve both voice communication (e.g., with a live advisor or voice response unit at the call center 20) and data communication (e.g., to provide Global Positioning System (GPS) location data or vehicle diagnostic data to the call center 20), the system can utilize a single call over a voice channel and switch as needed between voice and data transmission over the voice channel. For the purposes of this application, the one or more support vehicles 101 may also be equipped with the same or a similar vehicle management system 110 that is described in more detail below with respect to the host vehicle 100.

The vehicle management system 110 may include additional components that may enable a user to communicate with the vehicle management system 110 and other systems and systems, devices, or vehicles within the vehicle operating environment 10. For instance, a driver interface device 114 may include a mechanical park pawl or an electronic gear shifter comprising buttons or a dial, for example, so that an operator may change a gear status of the host vehicle 100 between park, reverse, neutral, drive, or low. As shown, the driver interface device 114 may be coupled to and communicate with a network connection interface 116. Some other non-limiting examples include a display device 118, a microphone 120, a speaker 122, input controls 124 (e.g., buttons, knobs, switches, touchpads, keyboards, touchscreens, etc.). The microphone 120) provides a vehicle occupant with means to input verbal or other auditory commands. The host vehicle 100 may be equipped with an embedded voice-processing unit utilizing human/machine (HMI) technology. The speaker 122 provides audible output to a vehicle occupant and may be either a stand-alone speaker dedicated for use with the vehicle management system 110 or may be part of an audio system 126. The audio system 126 is operatively connected to the network connection interface 116 and an audio bus 128 to receive analog information, rendering it as sound, via one or more speaker components.

The network connection interface 116 may be communicatively coupled to the vehicle management system 110. Some examples of the network connection interface 116 may include twisted pair/fiber optic Ethernet switch, internal/external parallel communication bus, a local area network (LAN) interface, a controller area network (CAN), a media-oriented system transfer (MOST), a local interconnection network (LIN) interface, and the like. Other communication interfaces may also include those that conform with ISO, SAE, and IEEE standards and specifications. The network connection interface 116 enables components of the vehicle management system 110 to send and receive signals with each other and with various systems and subsystems both within or "resident" to the host vehicle 100 and outside or "remote" from the host vehicle 100. This allows the host vehicle 100 to perform various vehicle functions, such as communicating with the one or more additional vehicles 101. For instance, the vehicle management system 110 receives and/or transmits data to/from an electronic control unit (ECU) 130, an engine control module (ECM) 132, a powertrain control module (PCM) 134, a sensor interface module(s) 136, a transmission control module 138, an ignition module 139, and assorted other vehicle ECUs, such as a brake system control module (BSCM), a climate control module (CCM), etc. According to one aspect of the present disclosure, the ECU 130, ECM 132, and the PCM 134 may be configured to receive instructions, via one or more signals or otherwise, to restore or inhibit operation of an ignition and/or an engine 102, 104 of the host vehicle 100.

The host vehicle 100 may be equipped with a sensor system 140 in communication network connection interface 116. While the host vehicle 100 maneuvers about the environment 100 or is at rest within the environment 10, the sensor system 140 can include various sensor subsystems configured to gather sensor data relating to characteristics of the environment 10 and/or status of the host vehicle 100. For instance, the sensor subsystem 140 may include a vehicle exterior sensor subsystem configured to measure or obtain external environmental data such surrounding objects (e.g., vehicles, bikes, pedestrians, etc.), an interior sensor subsystem configured to measure or obtain interior environmental data, such as vehicle occupancy, and/or a vehicle status sensor subsystem configured to measure or obtain vehicle operating data such as vehicle location and operating parameters.

With continued reference to FIG. 2, the communication system 112 is an onboard computing device that provides several functions, both individually and through its communication with other networked devices. The communication system 112 is generally composed of data processing hardware 143, each of which may be embodied as a discrete microprocessor, an application specific integrated circuit (ASIC), or a dedicated control module. The host vehicle 100 may offer centralized vehicle control via a central processing unit (CPU) 144 that is operatively coupled to memory hardware 146, each of which may take on the form of a CD-ROM, magnetic disk, IC device, semiconductor memory (e.g., various types of RAM or ROM), etc., and a real-time clock (RTC) 148. Long range vehicle communication capabilities, such as Global Network Satellite System (GNSS), with remote, off-board networked devices may be provided via one or more or all of a cellular chipset/component, a navigation and location chipset/component (e.g., global positioning system (GPS)), or a wireless modem, all of which are collectively represented at 150. Close-range wireless connectivity may be provided via a short-range wireless communication device 152 (e.g., a Bluetooth®; unit, near field communications (NFC) transceiver, ultra wideband module, etc.), a dedicated short-range communication (DSRC) component 154, and/or a dual antenna 156. It should be understood that the host vehicle 100 of any one of the one or more additional vehicles in the vehicle operating environment 10 may be implemented without one or more of the above listed components and functionality as desired for a particular end use. The various communications devices described above may be configured to exchange data as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), and/or Vehicle-to-Device (V2D).

The CPU 144 may receive data or instructions from one or more additional vehicles 101, the key fob 50, the mobile device 60, the back office 30, or the call center 20 so as to inhibit or restore operation of the ignition 102 or engine 104 of the host vehicle 100. Several methods of inhibiting and/or restoring operation of the ignition 102 and/or the engine 104 are presented below with respect to one or more aspects of the vehicle operating environment. As discussed in more detail below, the following methods may be desirable to provide an operator or owner of the host vehicle 100 more options for restoring operation of the ignition after it was inhibited (e.g., due to low connectivity). Similarly, the following methods may be desirable to provide an operator or owner of the host vehicle 100 more options for inhibiting operation of the ignition and/or engine (e.g., to prevent theft).

According to an aspect of the present disclosure, notifying the operator or owner of the host vehicle 100 that irreversible ignition 102 or engine 104 blocking is near may be desirable so that the operator or owner does not face a "walk home" scenario (i.e., the vehicle has to be towed to a dealership so that operation of the ignition and/or engine can be restored). For instance, if a party (e.g., an owner or operator through the mobile application 62 or an advisor via the call center 20) inhibits operation of the ignition or engine of the host vehicle 100 for any reason, the mobile application 62 or call center 20 may have a notification timer (e.g., a countdown of a number of days or hours) that tracks the amount of time that may pass before the host vehicle 100 is unreachable (e.g., due to low connectivity). This may be referred to as a reactive solution since the notification timer may alert the owner or operator of the vehicle or the call center 20 that operation of the ignition or engine of the host vehicle 100 needs to be restored and only the owner/operator via the mobile application 62 or call center 20) can initiate restoration of ignition or engine operation to avoid a scenario where the host vehicle 100 becomes unreachable.

According to another aspect of the present disclosure, a task and/or sequence based solution where upon when conditions are satisfied, the ignition or engine operation can be restored may be desirable so that direct intervention of the owner/operator or call center 20 is not required. For instance, the vehicle may include a task management system having a protocol and specification that resides between the back office 30 and the embedded vehicle management system 110. A sequence of dependent steps can be defined for the task management system and subsequently, actions can be taken where, instead of the advisor manually submitting a report/request to restore operation of the ignition or engine, the vehicle will have a series of sequences and conditions established (e.g., a set) so that once the conditions are satisfied then operation of the ignition and/or engine will be restored. In operation, once the conditions are satisfied, the host vehicle 100 would connect to the back office 30 and then send a notification to the back office system 30 so that the back office 30) can notify the mobile app or the advisor and then action could be taken to restore the ignition. In practice, if the battery is low or a certain amount of time has passed then the mobile application 62 or call center 20 can restore the ignition. (e.g., number of hours or battery level has dropped below threshold y).

According to another aspect of the present disclosure, it may be desirable to adjust parameters of the host vehicle 100 (e.g., of the vehicle management system 110) so as to extend (i.e., maximize) a window or time period for inhibiting and/or restoring operation of the ignition 102 and/or the engine 104 of the vehicle. Typically, the vehicle is set to be reachable for a certain amount of time (i.e., x number of days). Here, however, in at least one instance, parameters of the back office 30 and the vehicle management system 110 can be adjusted so that the time the host vehicle 100 is reachable by the mobile device or the call center 20, for example, is maximized and not arbitrarily set to a certain number of days. As a result, the owner or operator via the mobile application 62 and the call center 20 will have additional time to restore and/or inhibit operation of the ignition and/or engine of the host vehicle 100.

According to yet another aspect of the present disclosure, it may be desirable to inhibit operation of the ignition or engine of the vehicle in the absence of one or more conditions and restore operation of the ignition or engine of the vehicle in the presence of the one more conditions. For instance, a presence (i.e., a grouping) of a combination of physical devices (e.g., the mobile device 60, the key fob 50, other phones, tablets, etc.) and/or third parties (e.g., family member, friend, or defined group of people) may restore (i.e., enable) operation of the ignition 102 and/or engine 104. Similarly, an absence (i.e., a grouping) of a combination of physical devices (e.g., the mobile device 60, the key fob 50, other phones, tablets, etc.) and/or third parties (e.g., family member, friend, or defined group of people) may inhibit operation of the ignition 102 and/or engine 104. In at least one instance, the physical devices communicate with the communication system via the short range communication module 152. Additionally or alternatively, the third parties or defined group (i.e., a multiple) may be required authorize a request to inhibit operation as well as authorize a request to restore operation.

According to another aspect of the present disclosure, the one or more conditions may be proximity based condition. For instance, the condition may be whether a certain number people or other vehicles are in the vicinity of the host vehicle 100. Short range communication 152 (e.g., Bluetooth®) and/or long range communication 150 (i.e., cellular) may be used to determine whether the one or more conditions are satisfied. Also, crowd sourcing may be used to determine whether the one or more conditions are satisfied. In practical terms, if an owner or operator was at an event where there are a lot of other people or vehicles in the area, they may want the ignition of their vehicle to be inhibited until there are only a few people or vehicles in the area. In another instance, if an owner or operator of the host vehicle 100 is carpooling with one or more additional vehicles 101 the operation of the ignition and/or engine may be maintained depending on whether a certain number of additional vehicles that the owner/operator is expect are within the vicinity of the host vehicle 100.

Figure 3:
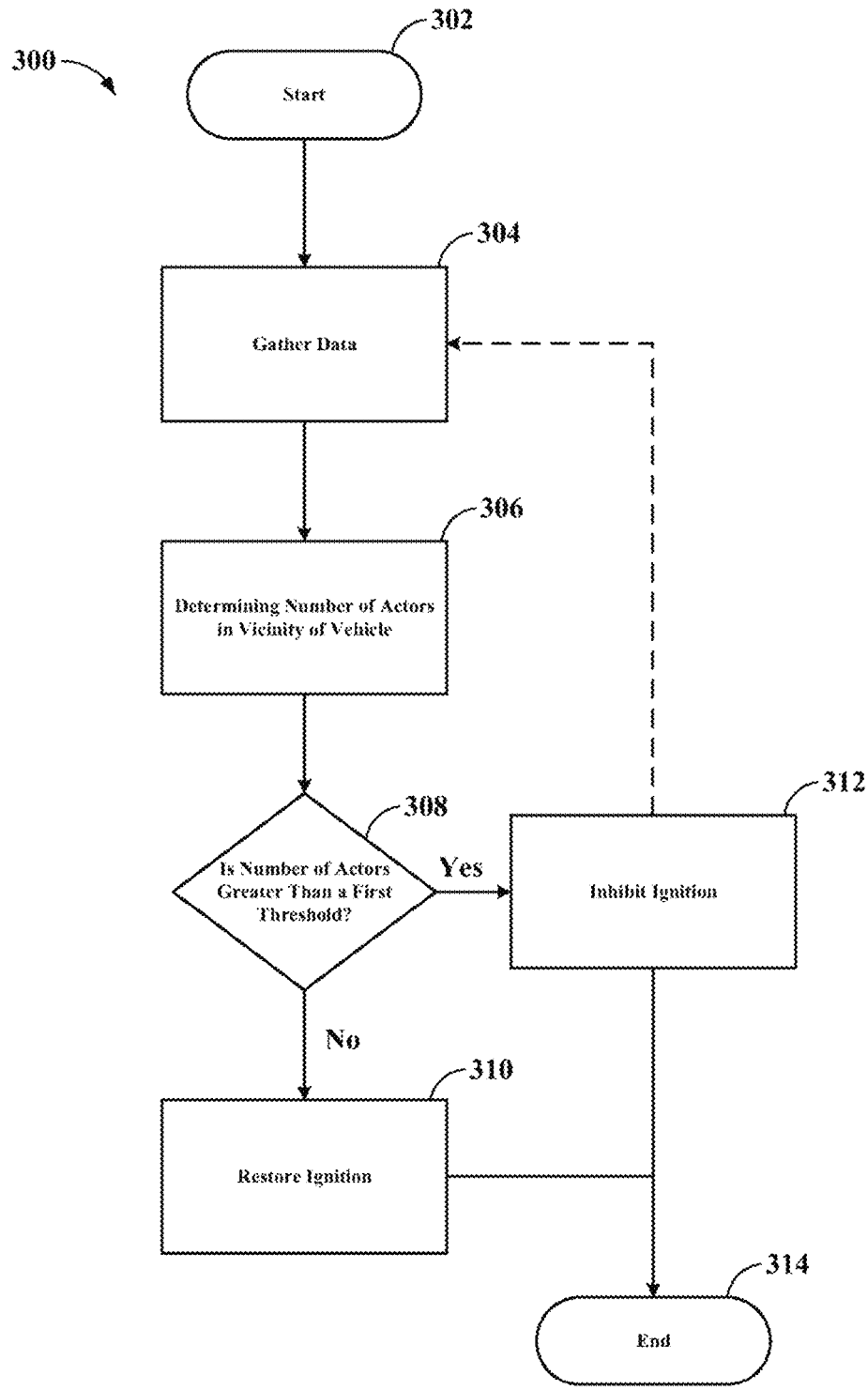
FIG. 3 is a flow diagram showing operations of the vehicle management system of FIG. 2.

With reference to FIG. 3, a method 300 of determining a number of actors within a proximity of the host vehicle 100 and either inhibiting or restoring operation of the ignition 102 and/or engine 104 is presented and discussed in detail below.

At 302, the method 300 is initiated. In practical terms, the method 300 is initiated so long as the host vehicle 100 is in at least a low power mode (e.g., Extended Discontinuous Reception (eDRX) or Power Saving Mode (PSM)). In other words, even if the host vehicle 100 has been sitting at rest for an extended period of time and is in a low power mode, the method 300) can still be carried out.

At 304, data can be gathered and/or received at the host vehicle 100 from one or more sources, such as from the mobile application 62 or from a web based application. The mobile application and/or the web based application may be configured to provide data to the host vehicle 100 that was gathered using a method of crowd sourcing, for example.

At 306, the number of actors within a proximity of the host vehicle 100 may be determined. The number of actors may be a number of people within the proximity (i.e., vicinity) of the host vehicle 100. The number of actors may be a number of one or more additional vehicles 101 within the proximity (i.e., vicinity) of the host vehicle 100.

At 308, if the number of actors is greater than a first threshold, then operation of the ignition 102 and/or engine 104 of the host vehicle 100 may be inhibited at 312. The first threshold may be calibrated depending on preferences of the owner and/or operator of the host vehicle 100, for example. If the number of actors is less than the first threshold, the operation of the ignition 102 and/or engine 104 of the vehicle may be restored at 310.

At 312, since operation of the ignition and/or engine is inhibited, the method may return to 304. Alternatively, after 310 or 312, the method may end at 314.

According to yet another aspect of the present disclosure, it may be desirable assess one or more environmental and/or vehicle conditions and adjust a window of operation of the host vehicle 100 accordingly. For instance, one or more environmental conditions may include a theft score which may be calculated based on time of day, geographical location of the vehicle, population size of a city or county that the vehicle is located, etc. In at least one instance, the theft score may be used to determine whether operation of the ignition and/or engine should be inhibited or restored. If the theft score is high, then the ignition and/or engine may inhibited until the theft score drops below a safety threshold. In other words, operation of the ignition and/or engine may be inhibited during the nighttime, but once morning comes and the theft score may drop below the safety threshold, operation of the ignition and/or engine may be restored. Another environmental condition may be relied on to determine whether operation of the ignition and/or engine is inhibited or restored may include operational hours of a nearby business. In an instance of a car dealership, it may be desirable to inhibit operation of ignitions and/or engines of vehicles parked in a parking lot of the dealership when the operational hours of the dealership indicate that the dealership is closed. Thus, once the operational hours of the dealership indicate that the dealership is open for business, then operation of the ignitions and/or engines of the vehicles in the parking lot of the dealership is restored. This may help prevent theft of one or more vehicles from a business, for example. The one or more vehicle conditions may include a battery charge level and/or cellular signal strength for cellular connectivity, for example. In at least one instance, if the battery level drops below a certain level or a cellular signal status indicates a degraded state, then operation of the ignition and/or engine of the host vehicle 100 may be inhibited or restored accordingly. Thus, provisioning a dynamic window or a group of days when the host vehicle 100 will be reachable can provide an owner and/or operator with more robust security and control over when the vehicle is operated.

Figure 4:
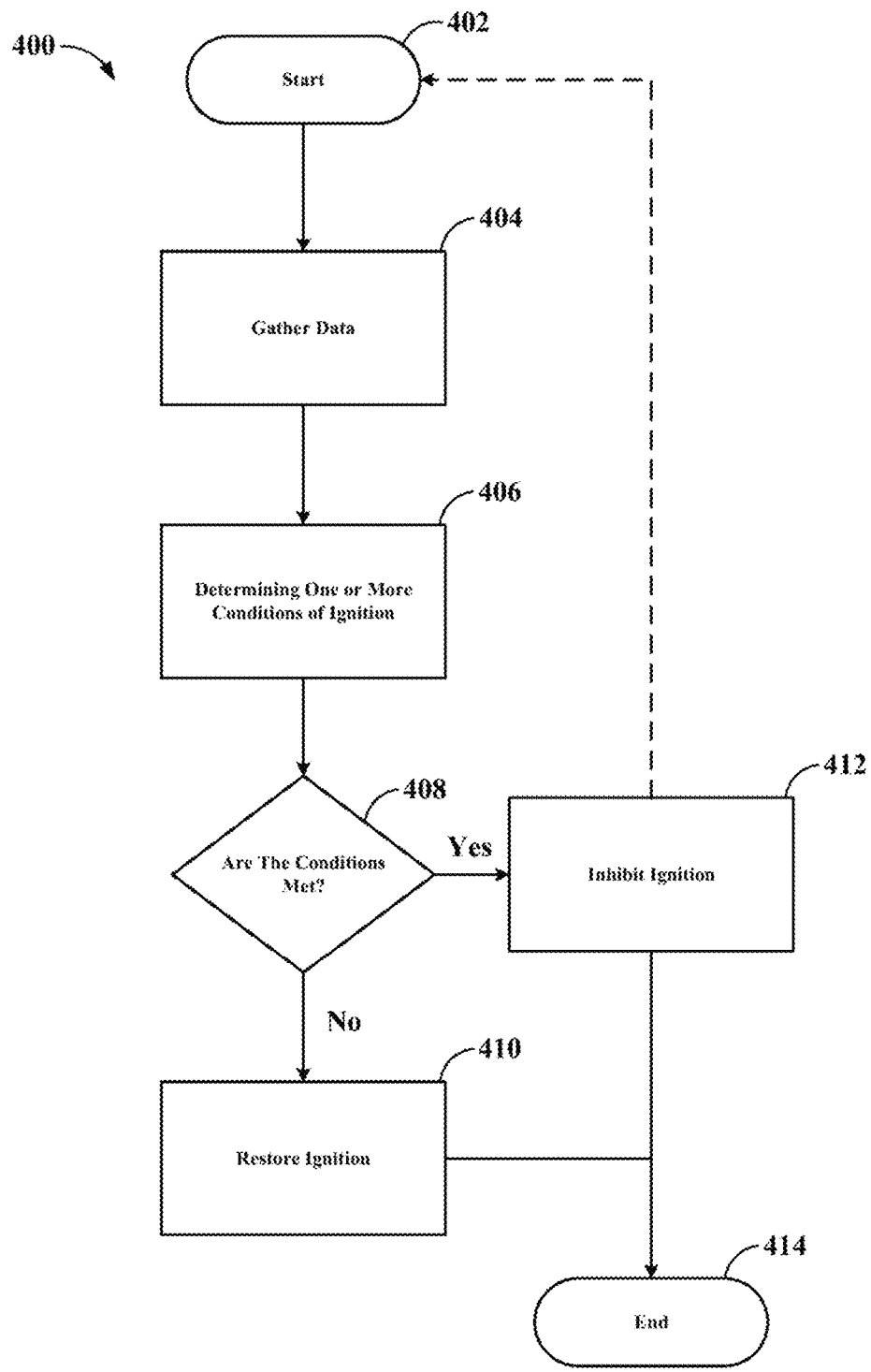
FIG. 4 is a flow diagram showing operations of the vehicle management system of FIG. 2.
Figure 5:
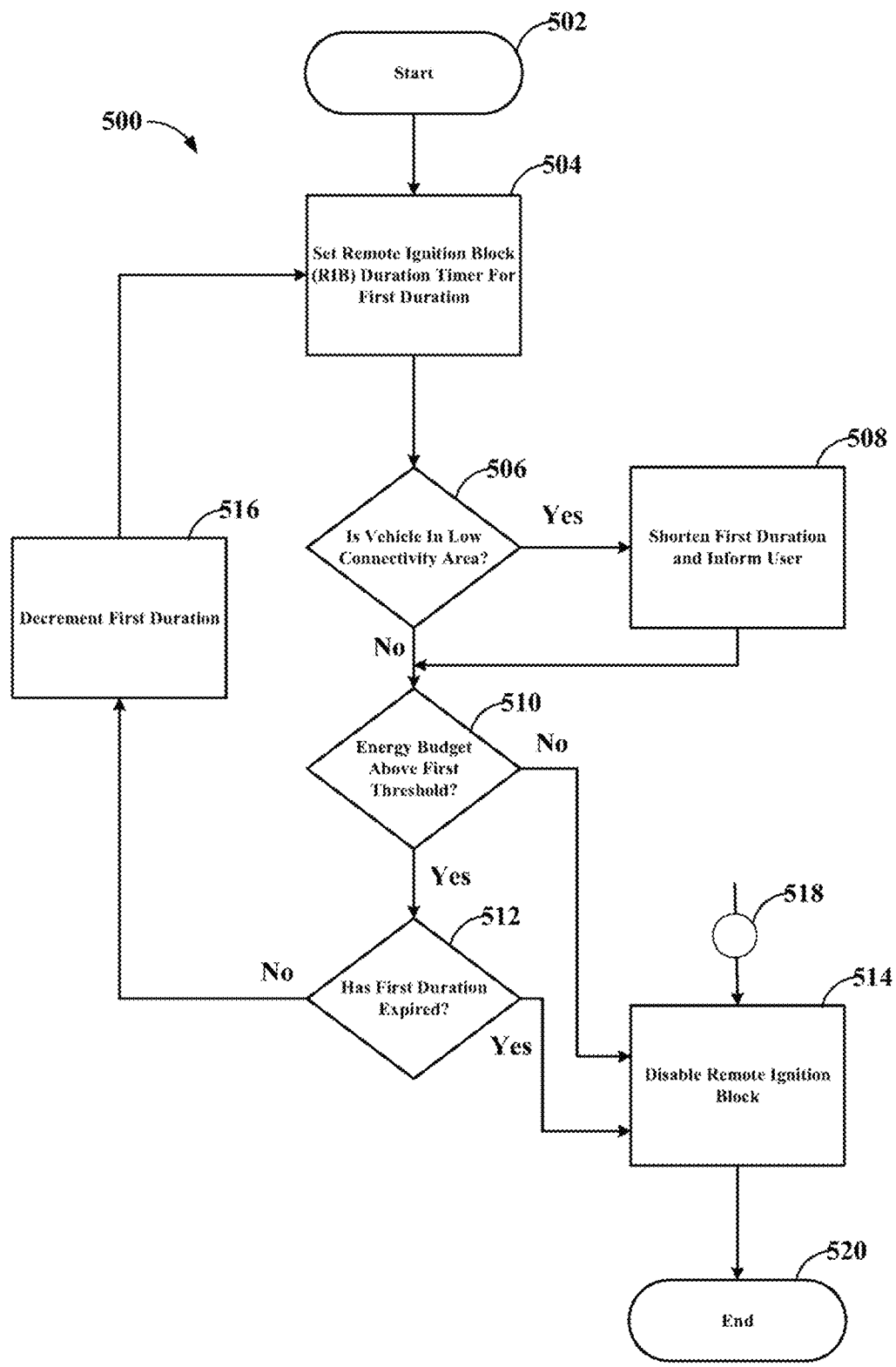
FIG. 5 is a flow diagram showing operations of the vehicle management system of FIG. 2.

With reference to FIG. 4, a method 400 of determining one or more conditions of ignition of the host vehicle 100 and either inhibiting or restoring operation of the ignition 102 and/or engine 104 depending on whether the one or more conditions are met is presented and discussed in greater detail below:

At 402, the method 400 is initiated. In practical terms, the method 400 is initiated so long as the host vehicle 100 is in at least a low power mode (e.g., Extended Discontinuous Reception (eDRX) or Power Saving Mode (PSM)). In other words, even if the host vehicle 100 has been sitting at rest for an extended period of time and is in a low power mode, the method 400 can still be carried out.

At 404, data can be gathered and/or received at the host vehicle 100 from one or more sources, such as from the mobile application 62, from a web based application, or from the sensor system 140 of the host vehicle 100. The mobile application and/or web based application may be configured to provide information concerning the environment of the vehicle. For instance, the mobile application 62 or web based application can provide information about the city or county where the host vehicle 100 is located or may be able to provide operational hours of a nearby establishment. The sensor system 140 of the host vehicle 100 may be able to provide operational information about the vehicle such as battery level or a condition (i.e., health) of one or more battery cells, for example.

At 406, the one or more conditions of ignition may be determined. The one or more conditions of ignition may include a theft score, the hours of operation of a nearby establishment, and the operational status of the host vehicle 100, for example.

At 408, if the one or more conditions are met, then operation of the ignition 102 and/or engine 104 of the host vehicle 100 may be inhibited at 412. If the one or more conditions are not met, then the operation of the ignition 102 and/or engine 104 of the vehicle may be restored at 410.

At 412, since operation of the ignition and/or engine is inhibited, the method 400 may return to 404. Alternatively, after 410 or 412, the method may end at 414.

According to yet another aspect of the present disclosure, a method 500 of remotely inhibiting ignition of the host vehicle 100 for a first duration and assessing the length of the first duration according to one or more vehicle conditions is presented and described in detail below.

At 502, the method 500 is initiated. In practical terms, the method 500 is initiated so long as the host vehicle 100 is in at least a low power mode (e.g., Extended Discontinuous Reception (eDRX) or Power Saving Mode (PSM)). In other words, even if the host vehicle 100 has been sitting at rest for an extended period of time and is in a low power mode, the method 500 can still be carried out.

At 504, ignition of the host vehicle 100 is remotely blocked for a first duration. This may be achieved via the mobile application 62, the back office 30, or the call center 20, for example. According to at least one aspect, the first duration may be for hours, days, or even weeks.

At 506, connectivity of the vehicle is evaluated and if the vehicle is not located in a low connectivity area, then the method 500 proceeds to 508. On the other hand, if the host vehicle 100 is located in a low connectivity area, then the method proceeds to 510.

At 508, the first duration of the remote ignition block is shortened. The amount that the first duration is shortened may be calibrated but it can be shortened by hours, days, or even weeks, for example.

At 510, an energy budget of the vehicle is evaluated and if the energy budget is above a first threshold then the method proceeds to 512. If, on the other hand, the energy budget is below the first threshold, then the method proceeds to 514.

At 512, if the first duration has expired then the method proceeds to 514. If the first duration has not expired, then the method 500 proceeds to 516 where the first duration is decremented and returns to 504.

At 514, the remote ignition block is disabled. Before the remote ignition block is disabled as a matter of course, the remote ignition block may be manually disabled 518 via the mobile application, the back office 30, and/or the call center 20, for example.

At 520, the method 500 ends.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle management system of a host vehicle comprising:
   a sensor system;
   an engine control module;
   an ignition module communicatively coupled to the engine control module;
   data processing hardware; and
   memory hardware in communication with the data processing hardware, the memory hardware storing instructions that, when executed on the data processing hardware, cause the data processing hardware to perform operations comprising:
   gathering data indicating a number of actors in proximity of the host vehicle, wherein the number of actors is a group of vehicles selected by an operator of the host vehicle via a mobile application on a mobile device that is communicatively coupled to the vehicle management system;
   determining whether the number of actors in proximity of the host vehicle is greater than a first threshold;
   inhibiting ignition of the host vehicle via the engine control module if the number of actors is greater than the first threshold; and
   restoring the ignition of the host vehicle via the engine control module if the number of actors is less than or equal to the first threshold.

2. The vehicle management system of claim 1, wherein the number of actors is a number of people within a vicinity of the host vehicle.

3. The vehicle management system of claim 1, wherein the number of actors is a number of vehicles within a vicinity of the host vehicle.

4. The vehicle management system of claim 1, wherein the number of actors is determined with crowdsourcing.

5. The vehicle management system of claim 1, wherein the number of actors is determined with long range and short range vehicle communication capabilities.

6. The vehicle management system of claim 1, wherein the operations further include determining whether the host vehicle is at least in a lower power mode.

7. A vehicle management system of a host vehicle comprising:
   a sensor system;
   an engine control module;
   an ignition module communicatively coupled to the engine control module;
   data processing hardware; and
   memory hardware in communication with the data processing hardware, the memory hardware storing instructions that, when executed on the data processing hardware, cause the data processing hardware to perform operations comprising:
   gathering data indicating a theft score and an operational status of the host vehicle, the theft score being calculated based on time of day, location of the host vehicle, and population size of a county where the host vehicle is located;
   determining one or more conditions of ignition of the host vehicle based on the theft score and the operational status of the host vehicle;
   inhibiting ignition of the host vehicle if the theft score is greater than or equal to a minimum theft score; and
   restoring ignition of the host vehicle if the theft score is less than the minimum theft score.

8. The vehicle management system of claim 7, wherein the operations further include determining whether the host vehicle is at least in a lower power mode.

9. The vehicle management system of claim 7, wherein the operations further include calculating the theft score via the data processing hardware and the memory hardware arranged onboard of the host vehicle.

10. The vehicle management system of claim 7, wherein the operations further include calculating the theft score via an off-board cloud computing system that is communicatively coupled to the host vehicle.

* * * * *